J. WYSS.
MILL OR MACHINE FOR GRINDING OR REDUCING ALFALFA TO MEAL.
APPLICATION FILED NOV. 12, 1907.
962,543.
Patented June 28, 1910.
3 SHEETS—SHEET 1.
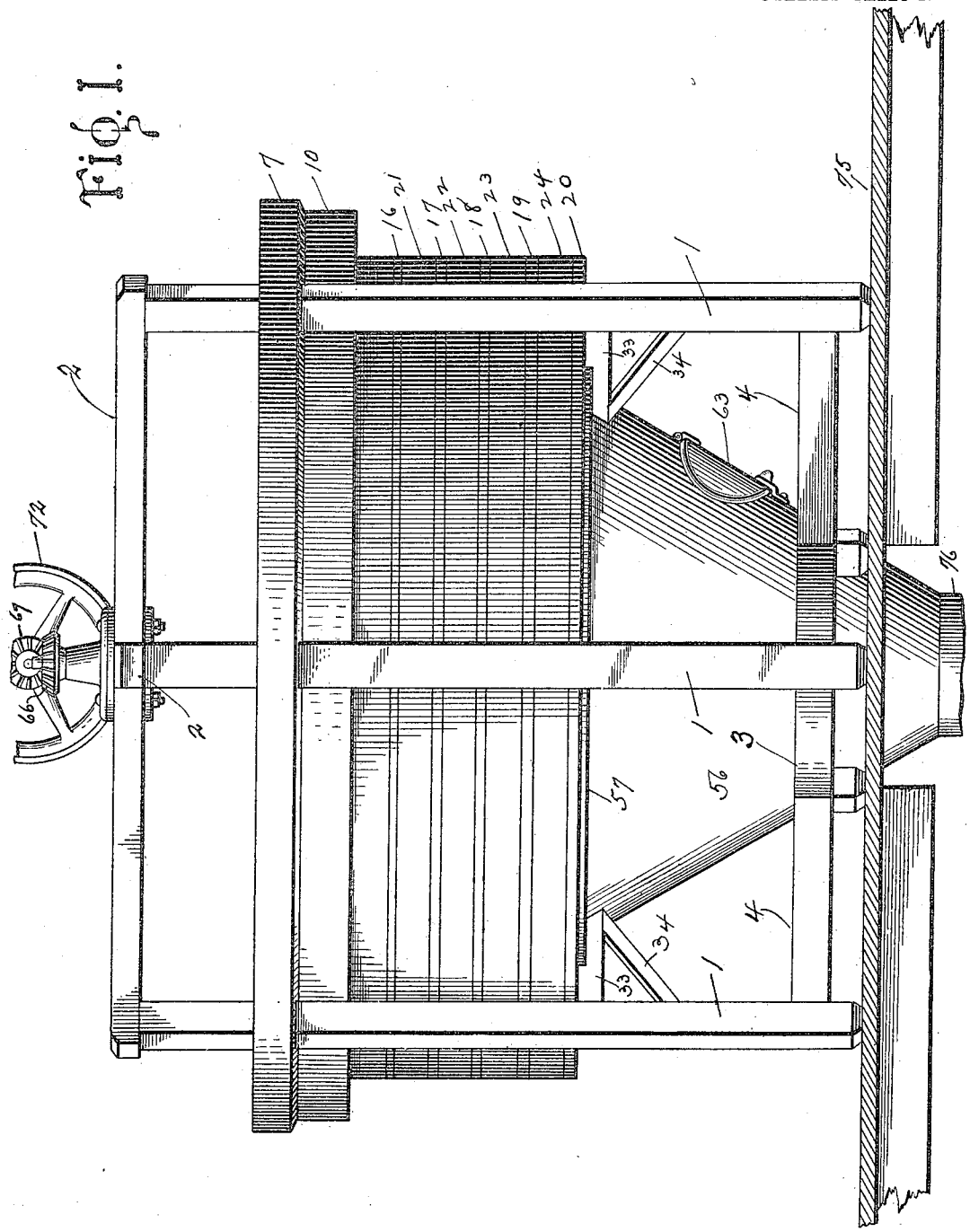
Witnesses:
Paul J. Gathmann
M. H. Gates
Inventor:
John Wyss
By Joseph F. Atkins,
Attorney.

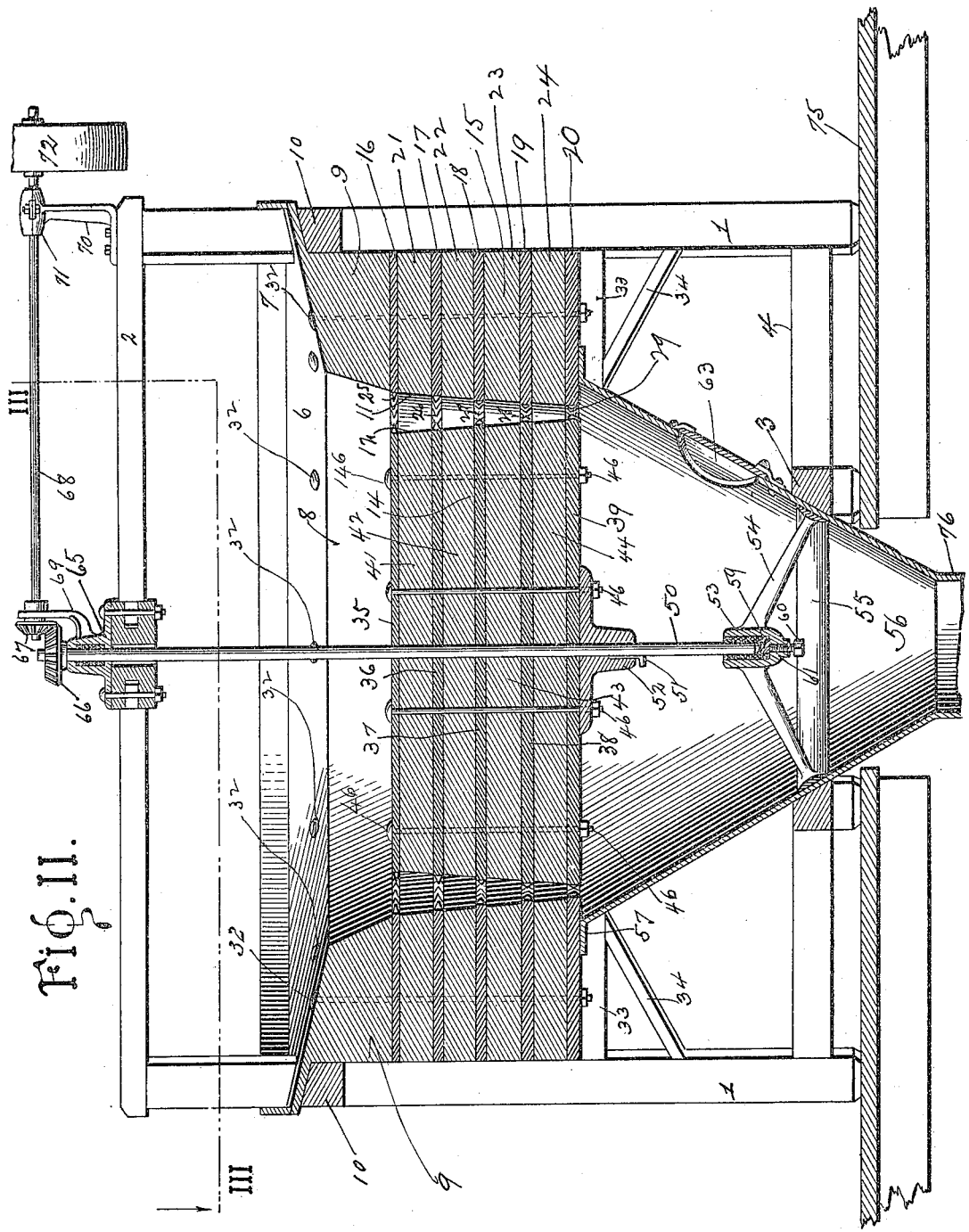

J. WYSS.
MILL OR MACHINE FOR GRINDING OR REDUCING ALFALFA TO MEAL.
APPLICATION FILED NOV. 12, 1907.
962,543.
Patented June 28, 1910.
3 SHEETS—SHEET 3.
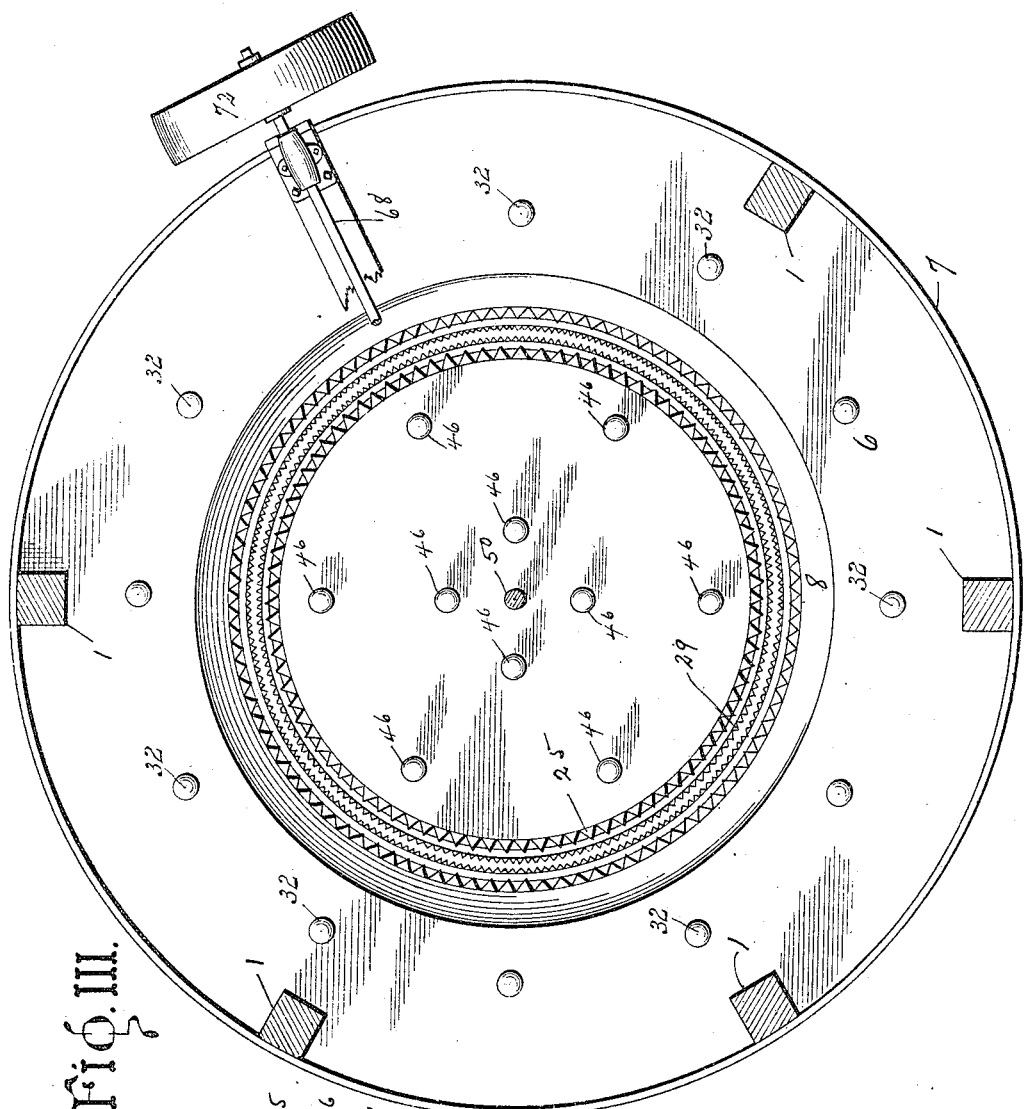

UNITED STATES PATENT OFFICE.

JOHN WYSS, OF JOHNSTOWN, COLORADO.

MILL OR MACHINE FOR GRINDING OR REDUCING ALFALFA TO MEAL.

962,543. Specification of Letters Patent. Patented June 28, 1910.

Application filed November 12, 1907. Serial No. 401,881.

*To all whom it may concern:*

Be it known that I, JOHN WYSS, of Johnstown, in the county of Weld, State of Colorado, have invented a certain new and useful Mill or Machine for Grinding or Reducing Alfalfa to Meal, of which the following is a specification.

The object of my invention is to produce a machine or mill which, in its operation, is adapted to reduce the hay of alfalfa or the like plant to a meal or meal-like product.

In alfalfa or other hay, the bulkiness of the material is such as to make it, good as it is recognized to be, objectionable on some accounts, for feed even to the kind of stock for whose use it is best adapted, and to render it wholly unavailable as feed for other kinds of stock, such as poultry, or the like. By the use of my invention, the plant is reduced to a condition in which it may be used to advantage in feeding all kinds of stock, such as horses, cows, hogs, and sheep, as well as poultry, and with increased advantage even to such kinds as those to which the natural plant is an accustomed article of food.

In carrying my invention into effect, account is, of course, taken of the nature of the plant, and provision is made for a gradual reduction thereof whereby a machine of comparatively large capacity, operating with economy of power, is made to turn out a product of regular and even quality suitable for the intended purpose specified.

What constitutes my invention will be hereinafter specified in detail and succinctly set forth in the appended claims.

In the accompanying drawings, which constitute a part of this specification, Figure I is a side elevation of a preferred form of embodiment of my invention, a portion of the wheel and gear of the driving mechanism being broken away. Fig. II is a diametrical vertical section of the subject matter of Fig. I. Fig. III is a section on the line III—III of Fig. II, being, in effect, an interior plan view of the machine. Fig. IV is a fragmental section corresponding, so far as it goes, to Fig. II, and illustrating the preferred angle of separation between the coöperating teeth or working-faces of my reducing members.

Referring to the numerals on the drawings, 1 indicates uprights, 2 cross-pieces, 3 a grist hopper collar, and 4 supporting members uniting the collar 3 and the uprights 1. The members enumerated constitute a simple, suitable, and, for that reason, preferred form of frame for my machine. The frame supports a preferably annular disk-shaped platform 6, preferably surrounded by a rim 7 and preferably communicating with a feed-hopper 8. As shown in Fig. II, the members 7 and 8 may be incorporated as surfaces to a single integral ring 9 supported by the uprights 1 upon an annular frame-piece 10. The member 10 may be, of course, made up of a plurality of segments, or of a single ring, as preferred. The rim 7 may be carried by the ring 9 about the periphery of the platform 6 as a separate member united to the ring 9, or it may be made integral therewith, as preferred. Such are mere details of construction, to which my invention is in nowise limited.

The feed-hopper 8 communicates with a downwardly tapering annular space, as illustrated, defined between the preferably inclined working-faces 11 and 12 of my coöperative reduction members, which members in their aggregate capacity are designated by the respective numerals 14 and 15.

The working-faces, in order to accomplish the work required of them, are of special and novel construction, which, in considerable measure, dictates the construction and relationship of the parts of the respective reduction members, to which, in their preferred form of embodiment, reference will now be made. In that preferred form of embodiment of my invention, as illustrated, the reduction-member 15 is made up of alternately disposed blades 16, 17, 18, 19 and 20, and blanks, or spacing members, 21, 22, 23, and 24. The number of blades, and, consequently, of spacing members may be varied, the number specified being that which I at present prefer as giving satisfactory results in actual practice, to which the machine has been reduced. The working-face 11 is defined by the inner edges of the respective blanks 21 to 24, inclusive, assembled so as to produce, in effect, one continuous working-face inclined from top to bottom as shown in Figs. II, III, and IV, respectively, but broken, at regular intervals, by the teeth 25, 26, 27, 28, and 29 of the successive blades 16 to 20, inclusive.

The teeth 25 to 29, inclusive, preferably gradually diminish in size, in regular gradation, from top to bottom, and, looking straight into the space into which they respectively project, are disposed, with reference to each other and to the blanks which separate the respective blades which carry them, so as to present themselves unobstructedly to material to be ground or reduced, descending to them from above.

The blades and blanks, which alternately disposed, as specified, constitute the preferred form of embodiment of my stationary or fixed reduction-member, are preferably of circular form, which, when assembled as shown in Fig. II, are united preferably with the member 9 into a single, solid mass as by bolts 32. The unitary, fixed reduction-member is preferably supported from below, by brackets 33, projecting inwardly from the respective uprights 1, their ends being supported as by struts 34.

In its preferred form of embodiment, my movable reduction-member 14, having the working-face 12 of a different angle of inclination from that of the working-face 11, is the counterpart of the fixed reduction-member 15, that is to say, it is a truncated cone having its periphery, or working-face 12, co-extensive with and correspondent to the working-face 11 of the fixed reduction-member, and the two working-faces preferably of upwardly divergent angles of inclination, as shown in Figs. II and III, and with special reference to their angles of inclination in Fig. IV. Like the member 15, the member 14 is composed of an alternating assemblage of blades and blanks, each blade being of disk shape and indicated, respectively, by the numerals 35, 36, 37, 38, and 39. Each blank, of like disk shape, is indicated, respectively, by the numerals 41, 42, 43, and 44. The several blades and blanks, which constitute the movable reduction-member, are, like the blades and blanks constituting the fixed reduction-member, united into a unitary whole, as by bolts 46 dispersed at suitable, regular intervals throughout the body of the reduction-member.

The relative thicknesses of the respective blades and blanks of the two reduction-members 14 and 15, as well as of the teeth of the respective blades, correspond so that when properly assembled the blades 20 are in the same horizontal plane with the blade 39, and their teeth, of corresponding set and gage, are in close juxtaposition. Above and against the blades 20 and 39, respectively, are assembled the blanks 24 and 44, respectively, of equal thickness and, therefore, serving to assemble the blades 19 and 38, respectively, in the same horizontal plane, with their teeth, of corresponding set and gage, opposed to each other, as shown, for example, in Fig. II. The distance between the teeth of the blades 19 and 38 is greater than that between the teeth 20 and 39 by a distance corresponding to the upward flare of the space between the inclined edges of the opposing blanks 24 and 44. In like manner, the distance between the respective fixed and movable blades continues to increase, and the size of the teeth thereof to increase until the last pair of blades 16 and 35 is reached, which constitutes the topmost of the series.

It has already been specified that the number of corresponding blades and blanks of the fixed and movable reduction-members, respectively, may be increased or diminished, as compared with the number shown in the drawings. It is also undesirable, and perhaps impracticable, to attempt to define the exact limits of operative dimensions of the members which constitute the working-faces 11 and 12; but it may be specified, by way of example, and in general terms, that the diameter of the respective reduction-members being variable at will and to suit different conditions, the blades 20 and 39, respectively, being made of steel plates 1/8 of an inch thick, their teeth may be made 1/32 of an inch deep, and the space between them fixed at 1/16 of an inch. The remaining blades may be made of thinner metal or not, as preferred, say 1/16 of an inch thick. The teeth of the blades 19 and 38, respectively, are set 5/16 of an inch apart. Those of the blades 18 and 37 are set 9/16 of an inch apart. Those of the blades 17 and 36 are set 13/16 of an inch apart, and those of the blades 16 and 35 are set 17/16 of an inch apart. The dimensions given are those of a practical working machine, and the angle of the working faces 11 and 12, corresponding to such dimensions, is drawn to scale in Fig. IV of the drawings, which figure is introduced for the purpose of showing the angle preferred. It should be clearly understood, however, that it is not my intention to limit myself to such dimensions, but merely to present them by way of example, in order to make a complete and intelligible disclosure of the principle of my invention to one skilled in the art.

The several blades of the several reduction-members being of steel of the thickness specified, the blanks may be made of metal or of wood, and of the thickness, say, of 1/2 of an inch. Such dimensions are dictated by the function which the blanks have to perform, which is to define in respect to each pair of blanks between their opposing faces on two sides and the teeth of the contiguous blades above and below them, recesses, which may be designated as auxiliary-feed-hoppers, because, receiving the grist from the co-acting teeth above them, they feed it, without choking, and as required, to the coacting teeth below them, and so on throughout the entire series. They are designated auxiliary-feed-hoppers in respect to the function just specified, because they serve, in effect, for their respective several coöperating sets of teeth, to perform the same function as the feed-hopper 8 performs for the co-acting teeth of the blades 16 and 35, the function of the hopper 8 being to deliver the natural product to those teeth for their operation upon it in the initial step of the reduction process.

The movement of the movable reduction-member 14 is preferably a rotative one, and to that end, the member 14 is fixed to a vertical shaft 50 as by means of a feather 51 inserted between it and a hub 52 that is secured to and incorporated with the member 14 as by a cluster of the bolts 46 which serve, as specified, to assemble the constituent elements of the member 14. The shaft 50 is preferably stepped in a cup-bearing 53 provided for it in a spider 54 that comprises an internal collar 55 set within and supported by the collar 3. Between the collar 55 and the collar 3 is interposed a discharge or grist-hopper 56, which being designed to carry away the grist from the machine to any suitable place of deposit for it, is secured, as by a flange 57, to the bottom of the reduction-member 15.

The presence of the spider provides for the support of the shaft without interruption of the flow of grist through the hopper 56. The end of the shaft 50 is preferably supported on a thrust block 59 which is adjustable by the aid of a screw bolt 60, threaded into the end of a box 61 constituting the central member of the spider. By turning the bolt 60 up or down the proper adjustment of the movable reduction-member 14, with respect to the fixed reduction-member 15, may be secured and preserved. A manhole 63 is preferably provided in the side of the hopper 50 for permitting convenient access to the working parts of the machine for such attention as they may require, and particularly for the adjustment of the bolt 60.

The upper end of the shaft 50 is preferably carried in a box 65 provided for it at the junction of the cross-pieces 2 and in vertical alinement with the bearing 53.

Any suitable means for affording bearings for the shaft 50 and for driving it may be substituted for those described and shown, which are presented only by way of example of suitable and convenient mechanism for the purpose. Such means for imparting rotative motion to the shaft 50 include a bevel-gear 66 fixed to the upper end of the shaft, and meshing with a corresponding gear 67, fixed to the end of a shaft 68 and sustained in operative relation to the gear 66 as by a bracket 69. An upright 70 provided with bearing 71 assists the bracket 69 in the support of the shaft 68, which is provided upon its free end with a pulley 72 representative of suitable means of applying power to the shaft to drive the machine.

In Figs. I and II, the frame of the machine is shown as set upon a floor 75, through which the hopper 56 extends into communication with a chute 76, but this is a mere matter of detail, and subject to variation at will.

Little description of the operation of my machine, in view of the foregoing specification, is deemed to be necessary. Suffice it to say that the material to be ground or reduced, such as alfalfa, for which the machine is particularly designed, is fed in bulk upon the platform 6, whence it descends into the feed-hopper 8. There it is caught between the opposing teeth of the blades 16 and 35, and between them undergoes the operation in the initial step of the reduction process. Such of the material as is deposited upon the top of the blade 35, or, in other words, the top of the movable reduction-member 14, is driven by the operation of centrifugal force toward the wall of the hopper 8 and within reach of the teeth of the first pair of blades just referred to. It will be, therefore, observed that my machine is self-feeding, in so far as material supplied to it is all automatically distributed to the initial point of reduction.

As the material passes the co-acting teeth of the first pair of blades, it enters the first auxiliary-hopper, above the teeth of the second pair of blades. Thence it passes to the second auxiliary-hopper above the teeth of the third pair of blades, and so on throughout the series, until finally passing between the teeth of the lowermost pair of blades 20 and 39, it finds egress into the grist-hopper 56 in the form of a meal or meal-like product of regular and uniform quality suitable as food for every kind of stock.

The effect of the alternation of blades and blanks in the preferred construction of my reduction-members produces, in effect, in each reduction-member a corrugated working-face, the corrugations being the teeth of the blades which project beyond the edges of the blanks comprised in the working-face.

The cut hay dropped from the cutter into the top blade of the rotating member of the machine being thrown by the centrifugal power into the open toothed space is, on account of the oppositely set teeth, evenly reduced as the product travels down through this said working space and emerges from the narrowest space into the hopper below. If the teeth were not arranged in this way, the reducing or grinding process would bring but an uneven and unsatisfactory product in this particular case of making meal from alfalfa hay. The spacing of the different pairs of blades in and outside being very important, enhancing as it does the rapid movement downward of the stuff in its course of reduction, furnishes another reason why the teeth from top to bottom have to be arranged in sets pointing against each other in the circumferential reducing and grinding space. The teeth are arranged in different sets of different sizes because the hay coming from the cutter being still bulky, varying in length from a quarter to a half inch or more, is thrown by the centrifugal power into the large toothed opening at the top, these teeth catching hold of it at once, shredding, cutting and working it down to the next set below. As the product moves down into the narrower grooving toothed space, it grows finer and the teeth getting smaller and closer, and spacing of blades narrower on the way down, the product is so gradually reduced and ground into a fineness equal to what is termed alfalfa meal. Therefore, in order to get the desired product from alfalfa hay with the machine, the following construction is found necessary: 1. The different pairs of blades be spaced, wider on top, and closer at bottom. 2. The teeth be arranged in sets. 3. The teeth in the different sets be of different sizes.

What I claim is:

1. The coöperative members one within the other and having their faces divergent upwardly and provided with oppositely arranged teeth in sets, and tapering blanks between the sets of teeth such blanks forming auxiliary hoppers.

2. In a machine of the kind described, the combination of coöperative and correlatively movable reduction-members provided, respectively, with working-faces defining between them a downwardly tapering annular space, and co-acting means upon the respective faces for effecting the reduction specified, said means consisting of correspondingly spaced and horizontally disposed toothed blades, the teeth of each opposing pair of blades diminishing in size from top to bottom of the annular space.

In testimony whereof I have hereunto signed my name in the presence of two subscribing witnesses.

JOHN WYSS.

Witnesses:
H. J. PARISH,
WM. PARKIN.